US005816756A

United States Patent [19]

Flohr et al.

[11] Patent Number: 5,816,756

[45] Date of Patent: Oct. 6, 1998

[54] DEVICE FOR ENGRAVING INTAGLIO CYLINDERS

[75] Inventors: Rainer Flohr, Bleienbach; Martin Schmitt-Lewen, Lotzwil, both of Switzerland

[73] Assignee: MDC Max Datwyler Bleienbach AG, Bleienbach, Switzerland

[21] Appl. No.: 640,485

[22] Filed: May 1, 1996

[30] Foreign Application Priority Data

May 2, 1995 [CH] Switzerland .......................... 01247/95

[51] Int. Cl.[6] ................................ B23D 5/04; B41C 1/04

[52] U.S. Cl. .......................... 409/317; 358/299; 409/166

[58] Field of Search .................................... 409/317, 108, 409/105, 165, 166, 298, 313, 293, 103, 141, 208; 358/297, 299; 82/1.11, 158, 118; 101/401.1, 494; 364/474.37; 29/560

[56] References Cited

U.S. PATENT DOCUMENTS

| | | | |
|---|---|---|---|
| 3,964,382 | 6/1976 | Baar | 101/494 |
| 4,181,077 | 1/1980 | Dalton | 101/401.1 |
| 4,805,312 | 2/1989 | Pätwyler | 409/141 X |
| 4,830,552 | 5/1989 | Ryf | 409/103 |
| 5,029,011 | 7/1991 | Fraser | 409/208 X |
| 5,438,422 | 8/1995 | Holowko et al. | 364/474.37 X |
| 5,454,306 | 10/1995 | Fraseral | 358/299 X |
| 5,475,914 | 12/1995 | Bornhorst, Jr. et al. | 29/560 |
| 5,492,057 | 2/1996 | Bornhors, Jr. et al. | 409/108 X |
| 5,621,533 | 4/1997 | Holowko et al. | 358/299 |

FOREIGN PATENT DOCUMENTS

| | | | |
|---|---|---|---|
| 0262634 | 4/1988 | European Pat. Off. . | |
| 2508985 | 9/1975 | Germany . | |
| 3201178 | 7/1983 | Germany . | |
| 8100320 | 2/1981 | WIPO | 358/299 |

OTHER PUBLICATIONS

European Search Report for RS 94985 dated Jun. 6, 1995 by J. Hazel.

*Primary Examiner*—William R. Briggs
*Attorney, Agent, or Firm*—Bell Seltzer Intellectual Property Law Group of Alston & Bird LLP

[57] ABSTRACT

A device for engraving intaglio cylinders and similar printing forms having an engraving tool which, together with a sensing member sensing the surface of the printing form to be engraved, is mounted in a holder movable relative to the surface of the printing form. The sensing member is a distance measuring member which contactlessly measures the distance from the surface of the printing form. On the basis of the distance measured from the distance-measuring member, the holder is adjusted relative to the surface of the printing form by an adjusting element, for maintaining a predetermined tool distance between the engraving tool and the surface to be engraved.

18 Claims, 2 Drawing Sheets

DEVICE FOR ENGRAVING INTAGLIO CYLINDERS

FIELD OF THE INVENTION

The invention relates to a device for engraving printing forms, such as intaglio cylinders, having an engraving tool and a sensing member for sensing the surface of printing form to be engraved and maintaining a predetermined tool distance from the surface to be engraved.

BACKGROUND OF THE INVENTION

Photoengraving machines are known, for example, from EP-B-0 262 634 and the corresponding U.S. Pat. No. 4,830, 552 which includes an engraving head which has, on a slide, a holder with an engraving burin and with a sensing member. The sensing member fixedly connected to the holder has a tip which senses the surface of the intaglio cylinder mechanically to guarantee a constant distance between the engraving burin and the surface. In order to suppress undesirable vibrations and natural resonances of the holder and of the engraving burin fastened on it, a damping arrangement provided with a compressor spring acts on the mechanical sensing member. This is intended to prevent the possibility that streak patterns will occur in the printing image during the engraving of the intaglio cylinder. Streak patterns are known in the art as "blinds".

During the mechanical sensing of the above-mentioned photoengraving machine, the engraving burin is tracked with a spatial displacement, so that, in the event of short-wave unevenness, different distances may occur between the engraving burin and the surface of the intaglio cylinder to be engraved. For these reasons, it is extremely important for the printing houses to keep the unevenness and out-of-roundness of the unmachined intaglio cylinder with a narrow tolerance range.

SUMMARY OF THE INVENTION

An object on which the present invention is based, is to keep the engraving tool at a constant distance from the surface of the intaglio cylinder to be engraved or a similar printing form, even in the case of short-wave unevenness and pronounced out-of-roundness.

This object is achieved by the present invention directed to a device for engraving intaglio forms having a sensing member for sensing the surface of the printing form to be engraved and a holder. The holder is adjustable relative to the work surface responsive to the distance measured by the sensor to maintain a predetermined work surface therebetween.

The invention is based on the knowledge that the sensing member of the above-mentioned known engraving device must bear with some pressure on the surface of the intaglio cylinder, so that the unevenness can be sensed correctly, and the natural vibrations occurring thereby have to be suppressed again by means of a damping arrangement. Because, according to the present invention, the sensing member is provided as a contactless distance-measuring member, the above vibrations cannot occur. Apart from that, the tip of the prior art sensing member has a specific sensing surface which, during operation, gradually becomes larger as a result of wear. It therefore has to periodically be checked and reground.

The invention thus has the advantage that the sensing member, carried out as a distance measurement, does not undergo any wear and therefore requires no periodic check.

Furthermore, the location of the distance measurement and the bearing point of the engraving burin can be located very near to one another or even coincide. As a result, even short-wave unevenness or out-of-roundness of the intaglio cylinder no longer have any influence on keeping the distance between the engraving tool and the surface to be engraved constant. Moreover, contactless sensing guarantees extremely rapid and precise measurement, so that an accurate adaptation of the distance in terms of locality and time is afforded. This means that time delays, which normally occur during the above-mentioned prior art mechanical sensing, are completely absent.

BRIEF DESCRIPTION OF THE DRAWINGS

Further advantages of the invention emerge from the dependent claims and from the following description, in which the invention is explained in more detail by means of an exemplary embodiment represented in the diagrammatic drawings. In these:

The same reference symbols are used in each case for the same elements in the figures, and the first explanations of the elements apply to all the figures, unless expressly specified otherwise.

DETAILED DESCRIPTION OF THE PREFERRED EMBODIMENTS

Figure 1:
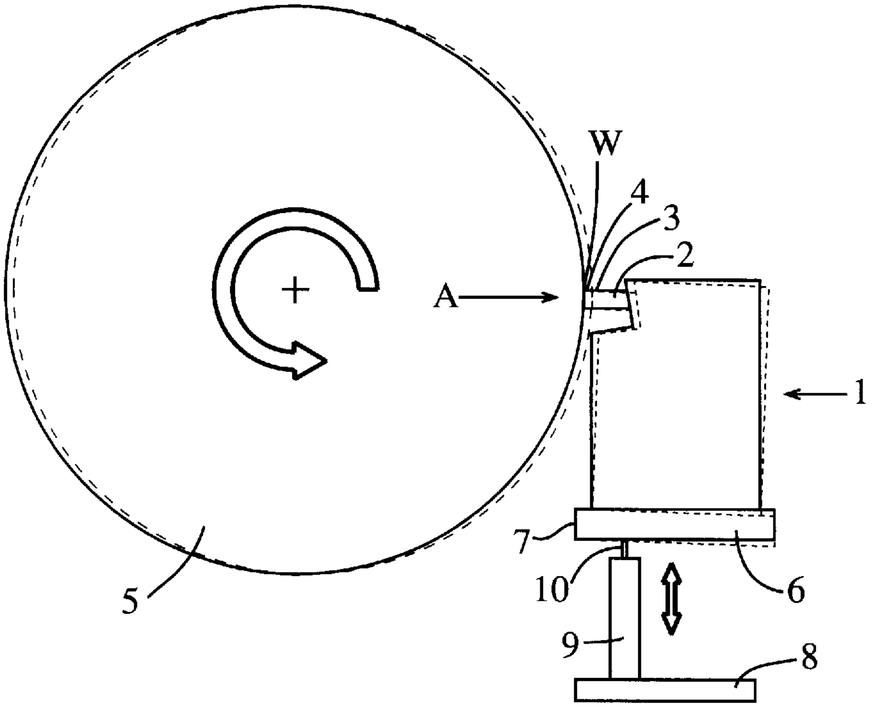
FIG. 1 shows a diagrammatic representation of an engraving machine having a contactless distance measuring member.

FIG. 1 represents an engraving machine 1 with a holder of engraving head 2 which has an engraving burin 3 and a distance-measuring member 4. The engraving burin 3 serves in a known way for producing screen wells in the surface of an intaglio cylinder 5. The control signal for the up-and-down movement of the engraving burin 3 is derived from an image signal obtained by sensing an original or is transmitted by a digital image-processing system. Further details as to the functioning of the photoengraving machine 1 are known in the relevant art and are therefore not mentioned further here.

The engraving head 2 is fastened on a lifting platform 6 which is mounted rotatably about an axis of rotation 7 and which is moved up and down in a tilting movement by an adjusting element 9 supported against the machine frame 8 and designed as a piezoelectric drive. In this case, the axis of rotation 7 is arranged at a fixed location relative to the machine frame 8, this not being shown further here for the sake of simplicity. This tilting movement of the lifting platform 6 is transmitted directly to the engraving head 2 and is followed by the engraving burin 3 fastened to it. The nearer the supporting point of the tappet 10 of the adjusting element or piezoelectric drive 9 is arranged to the axis of rotation 7, the greater the tilting movement becomes, and vice versa. Consequently, the transmission ratio between the deflection of the tappet 10 and the tracking of the tool distance W between the engraving burin 3 and the surface of the intaglio cylinder 5 can be set in keeping with the respective requirements.

Figure 2:
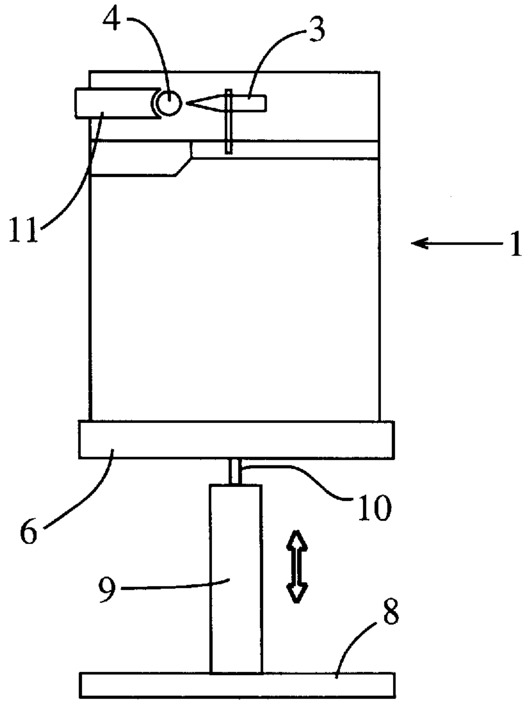
FIG. 2 shows a front view of the engraving head in the direction of the arrow A in FIG. 1.

In FIG. 2, the engraving head 2 can be seen in A front view in the direction of the arrow A of FIG. 1. In this example, the distance-measuring member 4 is provided, as a capacitive sensor, directly next to the engraving burin 3, so that the distance-measuring point and the engraving point for the screen wells are located near to one another. By a suitable choice of the measuring point, the latter is located on a screen line which lies in the direction of movement of the engraving burin 3. As a result, by means of a suitable electronic delay, a precise correction of the tool distance W can be carried out on the basis of the measured distance. This delay can be derived from the distance between the measuring point and the machining point of the engraving burin 3 and from the speed of movement of the engraving burin 3 along the screen line. Arranged next to the distance-measuring member 4 is an air-blowing nozzle 11 which blows away from the engraved cylinder surface dust and adhering metal chips which have accumulated on the surface of the intaglio cylinder 5. In addition, a suck-off device (not shown) is provided underneath the engraving head 2, so that the impurities in the form of dust, metal chips and the like can be removed effectively.

Figure 3A:
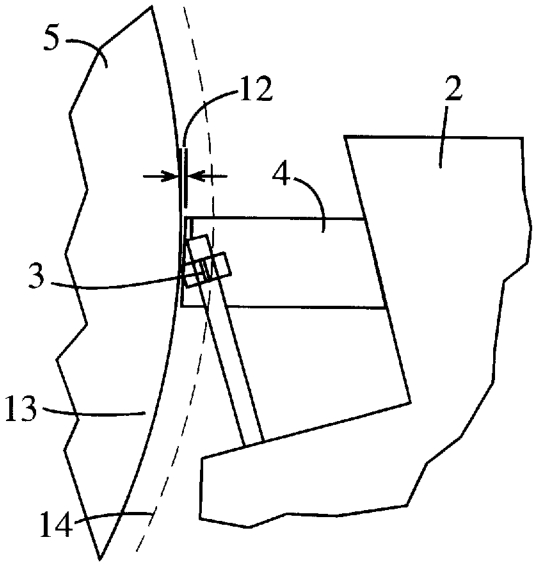
FIG. 3 shows an enlarged representation of FIG. 1 to illustrate the mode of operation.
Figure 3B:
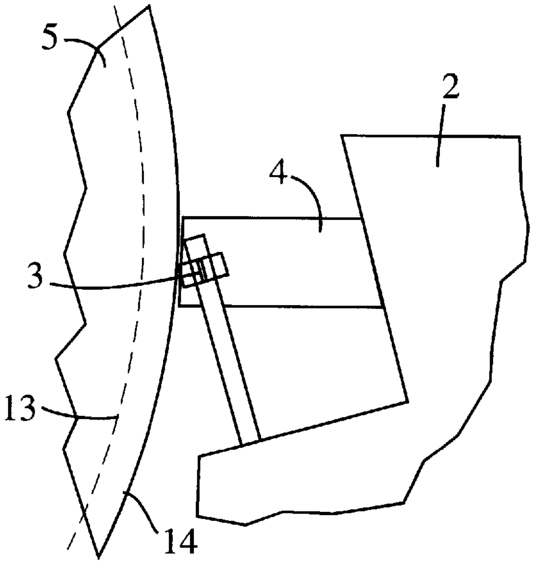

A detail of the engraving head 2 FIG. 1 is shown enlarged FIG. 3*a*. The narrow gap 12 between the cylinder surface 13 of the intaglio cylinder 5, having an exactly circular-cylindrical shape, and the measuring surface of the capacitive sensor 4 can be seen clearly. The air-blowing nozzle 11 is loaded with compressed air, in order to blow away the impurities from the gap 12 in the order of magnitude of 250 μm (microns). An out-of-roundness 14 of the cylinder 5 as a deviation of the cylinder surface 13 from the ideal circular-cylindrical shape is indicated by broken lines. The out-of-roundness 14 is represented by unbroken lines in FIG. 3*b* and causes a tilting movement of the lifting platform 6 about the axis of rotation 7, that is to say an adaptation of the tool distance W of the engraving burin 3. The air-blowing nozzle can also be designed as an annular nozzle (not shown here) which extends around the capacitive distance sensor 4 and forms a kind of protective curtain of compressed air around it and which thus always keeps a clean measuring surface free on the cylinder surface 13.

Figure 4:
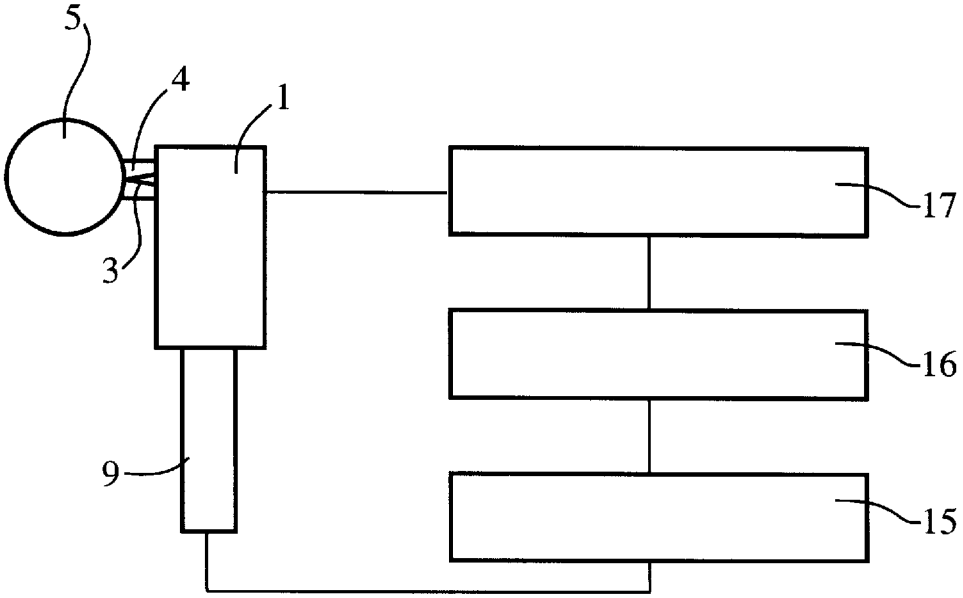
FIG. 4 shows a circuit diagram of the control of the tool distance of the engraving burin.

FIG. 4 shows diagrammatically the electronic control for tracking the tool distance of the engraving burin 3 on the basis of the distance measured by the distance-measuring member 4. The engraving head 2 is represented, bearing on the intaglio cylinder 5, with the piezoelectric drive 9 which is connected electrically to a drive control 15. This drive control 15 is connected via a regulating unit 16 to an electronic circuit 17 for distance measurement. In the circuit 17, the measured distance signal is compared with an actual value $W_{act}$ with a predetermined desired value $W_{des}$ which represents the ideal tool distance, and is transmitted as a regulating signal to the regulating unit 16. In the regulating unit, this regulating signal is prepared, by a suitable time delay and signal amplification, as a control signal to the drive control 15. This circuit thus constitutes a simple regulating loop, in order to keep the tool distance W of the engraving burin 3 constant in relation to the cylinder surface 13.

In the above example, the distance-measuring member 4 is designed as a capacitive distance sensor. Advantageously, however, the latter can also be an inductive or optical distance sensor. A pneumatic distance sensor, such as, for example, a dynamic-pressure sensor known from sheet-metal machining by lasers, can also be used for this purpose, the air blowing nozzle 11 being dispensed within this case, since the cleaning function is performed at the same time by such a sensor, An electromagnetic drive in the form of an electrostrictive or magnetostrictive actuating member, such as is known from motor vehicle technology in connection with so-called ABS systems, can also be used as an adjusting element 9 instead of a piezoelectric drive. A high-precision servomotor or a hydraulic drive can also be employed instead of the piezoelectric drive. The adjusting element 9 in the form of one of the above-mentioned drives is normally linearly movable, since the lifting platform 6 needs to execute only a slight tilting movement.

The drive of the engraving burin 3 can take place both in the conventional way and by means of a piezoelectric drive unit which is controlled in a suitable manner.

We claim:

1. A device for engraving intaglio forms comprising at least one engraving tool, an adjusting element and a sensing member to sense a surface of the printing form to be engraved, the engraving tool and the sensing member are mounted in a holder movable relative to the surface of the printing form, wherein the sensing member is a distance-measuring member contactlessly measuring a tool distance defined between the surface of the printing form and the engraving tool, wherein the tool distance is adjusted in a direction generally perpendicular to the surface of the printing form by said adjusting element based upon the tool distance measured by the distance-measuring member, for maintaining a predetermined tool distance between the surface of the printing form and the engraving tool.

2. A device according to claim 1, wherein the distance-measuring member is a capacitive measuring member.

3. A device according to claim 1, wherein the distance-measuring member is an inductive measuring member.

4. A device according the claim 1, wherein the distance-measuring member is an optical measuring member.

5. A device according to claim 1, wherein the distance-measuring member is a pneumatic measuring member.

6. A device according to claim 1, wherein the holder is mounted rotatably about an axis of rotation located at a distance from the engraving tool.

7. A device according to claim 6, further comprising an adjusting element which is linearly movable.

8. A device according to claim 7, wherein the adjusting element is a piezoelectric drive.

9. A device according to claim 7, wherein the adjusting element is an electromagnetic drive.

10. A device according to claim 9, wherein the electromagnetic drive is a magnetostrictive drive.

11. A drive according to claim 9, wherein the electromagnetic drive is an electrostrictive drive.

12. A device according to claim 7, wherein the adjusting element is a servo motor.

13. A device according to claim 1, wherein the distance-measuring member is positioned adjacent an air-blowing nozzle.

14. A device according to claim 13, wherein the air-blowing nozzle surrounds the distance-measuring member anularly.

15. A device for engraving intaglio forms comprising at least one engraving tool, a sensing member to sense a surface of the printing form to be engraved, and an air-blowing nozzle, the engraving tool and the sensing member being mounted in a holder movable relative to the surface of the printing form wherein the sensing member is a distance-measuring member contactlessly measuring the distance from the surface of the printing form and the holder is adjusted relative to the surface of the printing form by an adjusting element based upon the distance measured by the distance-measuring member for maintaining a predetermined tool distance between the surface of the printing form and the engraving tool, said air-blowing nozzle being positioned adjacent the distance-measuring member.

16. A device for engraving intaglio forms comprising at least one engraving tool and a sensing member to sense a surface of the printing form to be engraved, the engraving tool and the sensing member are mounted in a holder movable relative to the surface of the printing form and rotatably mounted about an axis of rotation located a distance from the engraving tool, wherein the sensing member is a distance-measuring member contactlessly measuring the distance from the surface of the printing form, the holder is adjusted relative to the surface of the printing form by a linearly movable adjusting element which is a piezoelectrive drive wherein the holder is adjusted by the adjusting element based upon the distance measured by the distance-measuring member, for maintaining a predetermined tool distance between the surface of the printing form and the engraving tool.

17. A device for engraving intaglio forms comprising at least one engraving tool and a sensing member to sense a surface of the printing form to be engraved, the engraving tool and the sensing member are mounted in a holder movable relative to the surface of the printing form and rotatably mounted about an axis of rotation located a distance from the engraving tool, wherein the sensing member is a distance-measuring member contactlessly measuring the distance from the surface of the printing form, the holder is adjusted relative to the surface of the printing form by a linearly movable adjusting element which is an electromagnetic drive wherein the holder is adjusted by the adjusting element based upon the distance measured by the distance-measuring member, for maintaining a predetermined tool distance between the surface of the printing form and the engraving tool.

18. A device for engraving intaglio forms comprising at least one engraving tool and a sensing member to sense a surface of the printing form to be engraved, the engraving tool and the sensing member are mounted in a holder movable relative to the surface of the printing form and rotatably mounted about an axis of rotation located a distance from the engraving tool, wherein the sensing member is a distance-measuring member contactlessly measuring the distance from the surface of the printing form, the holder is adjusted relative to the surface of the printing form by a linearly movable adjusting element which is a servo motor wherein the holder is adjusted by the adjusting element based upon the distance measured by the distance-measuring member, for maintaining a predetermined tool distance between the surface of the printing form and the engraving tool.

* * * * *